United States Patent [19]

Toma et al.

[11] 4,114,016
[45] Sep. 12, 1978

[54] WELDING MACHINE AUXILIARY TRANSFER CLAMP

[75] Inventors: Charles A. Toma, Warren; Walter F. Haessly, Salem, both of Ohio

[73] Assignee: The Taylor-Winfield Corporation, Warren, Ohio

[21] Appl. No.: 678,153

[22] Filed: Apr. 19, 1976

[51] Int. Cl.² ............................................. B23K 11/04
[52] U.S. Cl. ..................................... 219/97; 219/101; 219/161
[58] Field of Search ................. 219/97, 101, 158, 161; 228/49; 269/37

[56] References Cited

U.S. PATENT DOCUMENTS

| 2,875,319 | 2/1959 | Stieglitz | 219/101 |
| 3,122,118 | 2/1964 | Cooper | 219/158 X |
| 3,190,525 | 6/1965 | Foley et al. | 228/49 |
| 3,249,732 | 5/1966 | Cooper et al. | 219/97 |
| 3,325,624 | 6/1967 | Paulet, Jr. et al. | 219/101 X |

FOREIGN PATENT DOCUMENTS 400,939  11/1933  United Kingdom ..................... 219/101

Primary Examiner—E. A. Goldberg
Attorney, Agent, or Firm—William J. Ruano

[57] ABSTRACT

A welding machine auxiliary transfer clamp for pushing the end of a coil against a spacer bar and including a pair of clamping elements, each including a cylindrical ram operated by fluid cylinder, there being a ball connection intermediate each fluid cylinder and its respective ram to enable the upper and lower rams to pivot freely about their longitudinal axis so as to prevent occurrence of a gap otherwise formed by lateral tilting of the coil, whose end is to be welded.

1 Claim, 6 Drawing Figures

WELDING MACHINE AUXILIARY TRANSFER CLAMP

This invention relates to an auxiliary transfer clamp unit for a welding machine.

A required operation in the joining steel coils, when using a combination welder-trimmer, such as shown in U.S. Pat. No. 3,249,732 dated May 3, 1966, assigned to the present assignee (see the present drawing), is to load the sheared tail end of the coil 2 (FIG. 1) up against the spacer plate 3 without a gap g (FIG. 2) existing at either end. The long free end of the coil 2 is butted up against the spacer plate 3, and the exit looper is operated to form the loop in the coil 2. The purpose of the loop is to provide flexibility of the stip end 1 for centering as well as a means of developing the force required to push and hold the tail end 1 against the spacer plate 3 for clamping. The normal direction of movement of the coil 2 when the ends are welded together is from left to right as viewed in FIG. 1.

Upon visual inspection and satisfaction of the operator, the strip end 1 is clamped in the exit welding dies 4. At the completion of clamping both coil ends and removing the spacer plate 3, the strip ends are brought together. The result of the inaccuracy of positioning the strip end 1 with the spacer plate 3 will be quite evident and occasionally the strip end must be released, relocated and reclamped. Repeated operations mean loss of time and production.

An object of the present invention is to overcome the abovementioned disadvantages in the operation of a welding machine by the addition of an auxiliary transfer clamp, of the present invention, to the combination welder-trimmer so as to provide a means whereby a positive force may be applied by the tail end 1 of the coil 2 when it is butted up against the spacer plate 3.

Other objects and advantages will become more apparent from a study of the following description taken with the accompanying drawings wherein.

Figure 1:
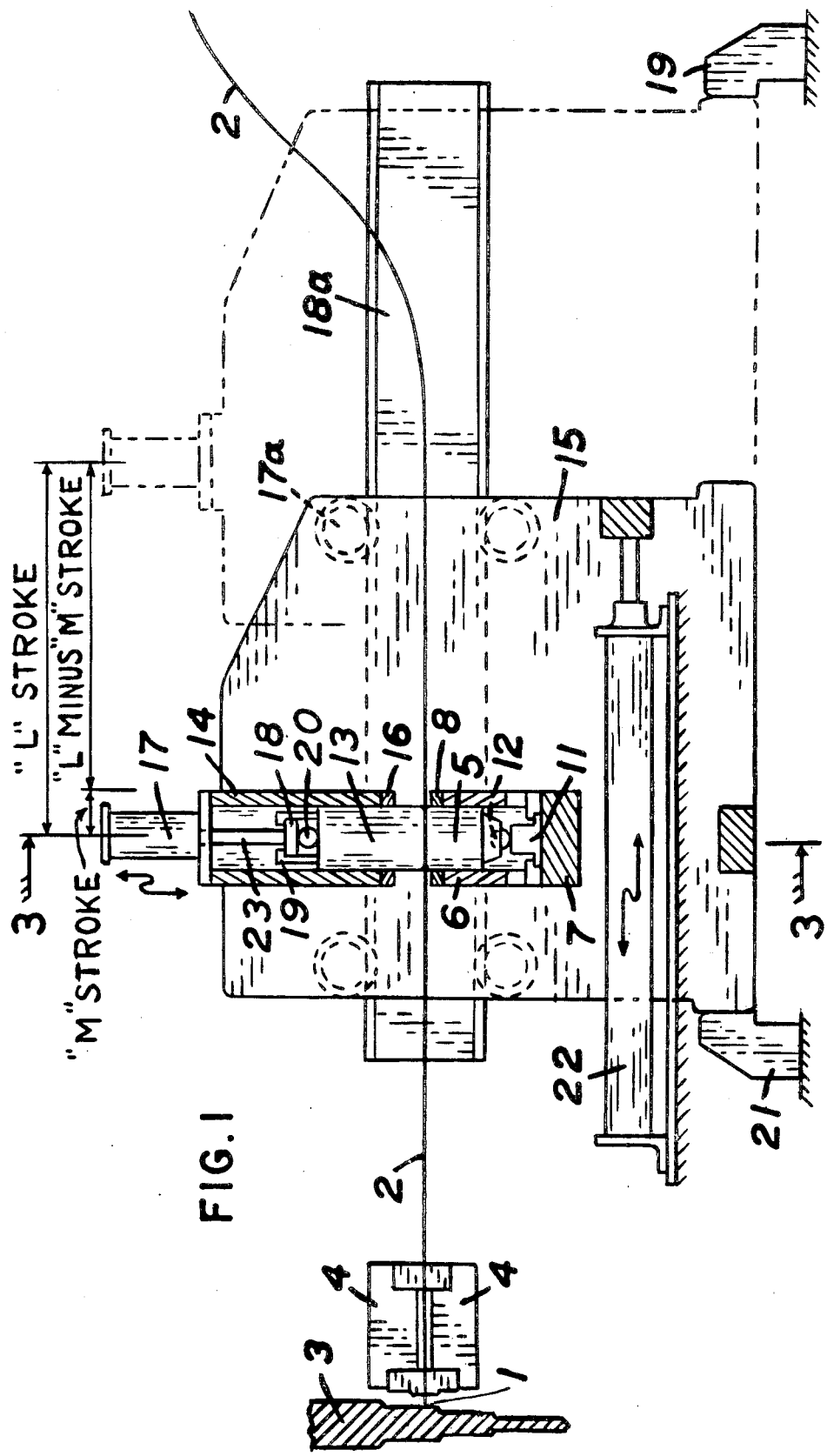
FIG. 1 is an elevational view of the exit side of a welding machine equipped with an auxiliary transfer clamp unit embodying the present invention.

The auxiliary clamp consists of two, independent, air operated clamping rams 5 and 13.

The lower clamp ram 5 is mounted in a housing 6 which is attached to the transfer carriage clamping beam 7. The clamping beam 7 has mounted on it, the lower clamp shoe 8 and is raised or lowered by a pair of hydraulic clamp cylinders 9. The lower clamp ram 5 is raised by the action of the wedge 11 driven by air cylinder 10. Contact between the lower clamp ram 5 and wedge 11 is through the solid steel ball 12. Gravity lowers the lower clamp ram 5 when the wedge 11 is withdrawn by the air cylinder 10.

The upper clamp ram 13 is mounted in a housing 14 which is attached to the stationary bridge of the transfer carriage 15. The upper clamp ram 13 is connected to the upper clamp cylinder 17 by a circular piston rod end 18 (FIG. 1) gripped by a split circular clamp 19. A steel ball 20 is positioned between the upper clamp ram 13 and the piston rod end 18.

OPERATION

Figure 4:
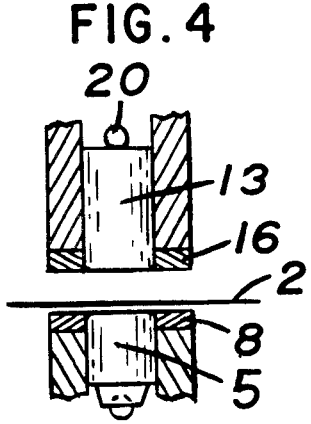
FIGS. 4, 5 and 6 show different positions of the clamps and rams.
Figure 6:
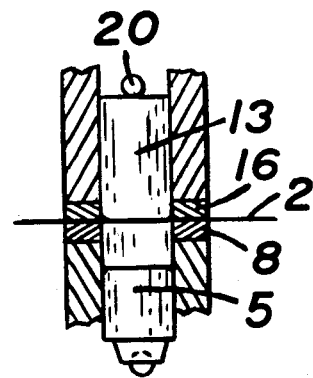

After making a weld, the transfer carriage 15 holding the coil 2 clamped between upper clamp shoe 16 and lower clamp shoe 8 (see FIG. 6) moves through stroke L (FIG. 1) by means of the transfer cylinder 22. The transfer carriage 15 supported by rolls 17a-17b rides on the transfer rails 18a, 18b. The distance of stroke L is determined by a carriage stop 19. The dot and dash outline shows the limit of movement of the transfer carriage 15. Transfer carriage 15 clamp beam 7 is lowered to release the coil 2 (see FIG. 4). Action of the transfer cylinder 22 is reversed to move the transfer carriage 15 through stroke L minus M where it awaits the next weld sequence.

The tail end 1 of the coil 2 is sheared, positioned beyond the exit welding dies 4 and the spacer plate 3 lowered. Travel direction of the coil 2 is reversed to butt the strip end 1 against the spacer plate 3. The exit looper is operated to form the loop in the coil 2.

Figure 5:
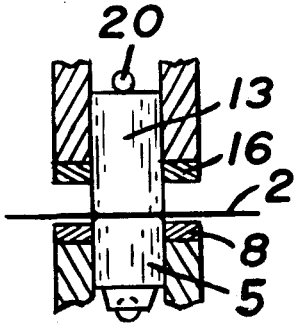

The control valve of the wedge cylinder 10 is operated to horizontally extend the wedge cylinder 10 piston rod 19 driving the wedge 11 forwardly, thereby raising the lower clamp ram 5. Completion of wedge 11 movement signals the operation of the upper clamp ram 13 control valve. The piston rod 23 of the upper clamp cylinder 17 extends, lowering the upper clamp ram 13 to clamp the coil 2 between the rams 5-13 (see FIG. 5).

The transfer cylinder 22 is again activated to move the transfer carriage 13 through the short stroke M which is limited by a stop 21. the clamped coil 2 moving through this short stroke M results in a positive contact of the strip end 1 and the spacer plate 3 and this contact will be maintained for clamping of the strip end 1 in the exit welding dies 4.

Figure 2:
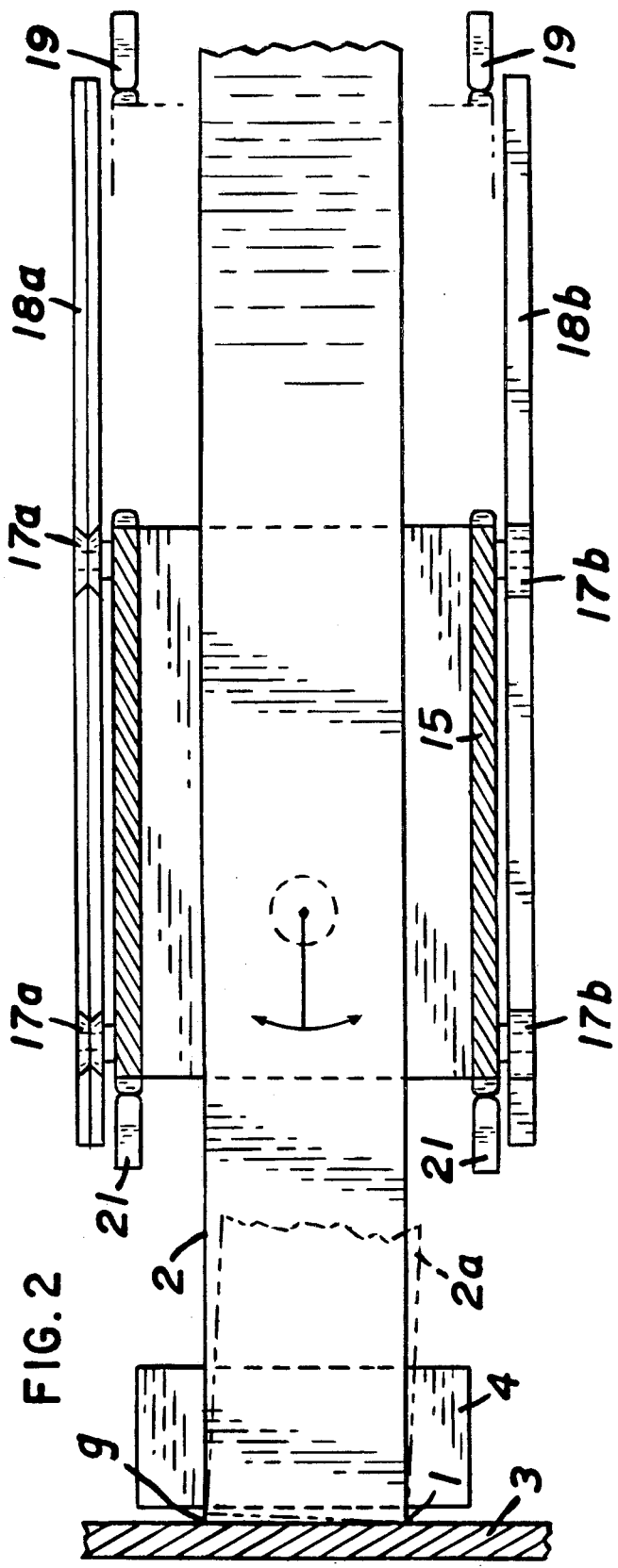
FIG. 2 is a top or plan view thereof.
Figure 3:
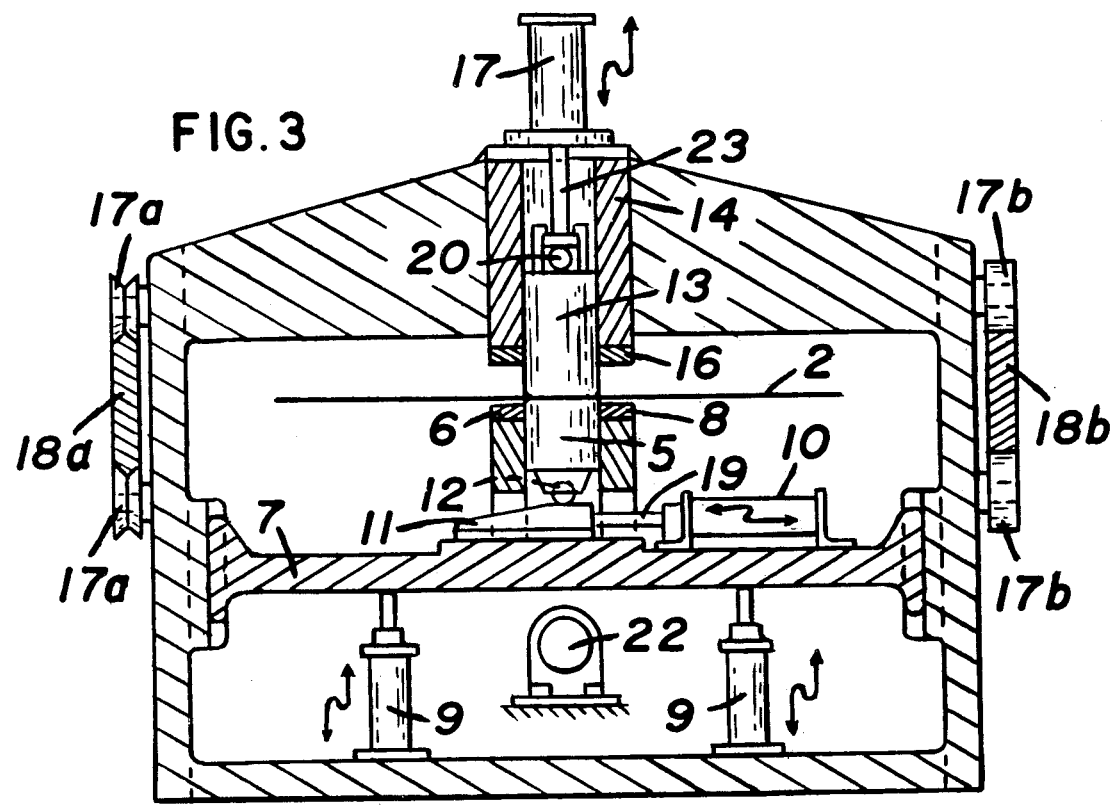
FIG. 3 is a sectional end view thereof.

Though the coil 2 had been clamped by the auxiliary transfer clamp, it was free to be pivoted to either direction by the centering device in order to be properly positioned against the spacer plate 3. That is, and referring to FIG. 5, since the lower ram 5 was raised to free coil from the lower clamp shoe 8, and since the coil 2 is clamped solely by rams 5 and 13,—also since the upper steel ball 20 and lower steel ball 12 allow the rams 5 and 13 to freely pivot in either direction about the axes of the rams, as shown by the arrows in FIG. 2, any gap g that tends to develop will be avoided by the automatic centering provided by such construction. Moreover, since the amount of clamping pressure of rams 5 and 13 by the air cylinders 17 and 10 is limited, a slight slippage of the clamping can occur if the coil is forced too tightly against spacer plate 3.

The addition of the auxiliary transfer clamp of the present invention will assure the proper positioning of the tail end 1 of the coil 2 against the spacer plate 3 for clamping the strip end 1 in the welder without the need of repeating coil positioning and clamping, resulting in less lost time and in increased production.

Thus it will be seen that we have provided an efficient auxiliary transfer clamp for a welding machine to provide a positive force by the tail end of the coil, when butted up against the spacer plate, while allowing the coil to pivot freely about the central axis of the clamp to assure that no gap exists between such tail end and the spacer plate, thereby assuring good welds after the trail ends are clamped between the welding dies and brought together for welding.

While we have illustrated and described a single specific embodiment of our invention, it will be understood that this is by way of illustration only that various changes and modifications may be contemplated in our invention and within the scope of the present claims.

We claim:

1. In a welding machine having a spacer plate against which the end of a coil, to be welded, is held; the improvement comprising a carriage on the welding machine supporting an auxiliary transfer clamp unit including a pair of clamping elements including upper and lower clamp shoes, each including a cylindrical ram operated by a fluid cylinder, a spherical ball connection intermediate each said fluid cylinders and its respective ram to allow said upper and lower rams to pivot freely only about the longitudinal axes of said rams, without lateral movement, so as to prevent the occurrence of a gap, a clamping beam which is vertically movable by fluid operated means mounted on the frame of said carriage, a wedge movable horizontally by a fluid operated cylinder mounted on said clamping beam and engageable with said ball connection of said lower ram to effect clamping movement thereof.

* * * * *